United States Patent
Cobianco et al.

[11] Patent Number: 6,133,211
[45] Date of Patent: Oct. 17, 2000

[54] BLOCK COPOLYMERS, THEIR PREPARATION AND THEIR USE AS LUBRICANTS

[75] Inventors: Sandra Cobianco; Alessandro Lezzi, both of Milan; Alberto Forlini, Travaco Siccomario; Emilio Gatti, Milan, all of Italy

[73] Assignee: Agip Petroli S.p.A., Rome, Italy

[21] Appl. No.: 08/960,717

[22] Filed: Oct. 30, 1997

Related U.S. Application Data

[63] Continuation of application No. 08/678,246, Jul. 11, 1996, abandoned.

[30] Foreign Application Priority Data

Jul. 28, 1995 [IT] Italy .............................. MI95A1652 U

[51] Int. Cl.[7] ........................ C10M 145/34; C07C 43/11; C08G 65/08
[52] U.S. Cl. ........................ 508/579; 508/562; 508/567; 508/570; 525/409; 525/410; 528/419; 528/421; 568/589; 568/624; 568/625
[58] Field of Search ................................ 508/562, 567, 508/570, 579; 525/409, 410; 528/419, 421; 568/589, 624, 625

[56] References Cited

U.S. PATENT DOCUMENTS

| | | | |
|---|---|---|---|
| 2,828,261 | 3/1958 | Milberger | 508/579 |
| 3,029,216 | 4/1962 | Bailey | 525/409 |
| 3,509,052 | 4/1970 | Murphy | 508/579 |
| 3,956,401 | 5/1976 | Scardera . | |
| 4,230,612 | 10/1980 | Praetorius | 528/419 |
| 4,481,123 | 11/1984 | Hentschel et al. | 252/52 A |
| 4,731,190 | 3/1988 | O'Lenick | 508/579 |
| 4,764,567 | 8/1988 | Ott | 528/421 |
| 4,793,939 | 12/1988 | Simmons | 252/52 A |
| 5,294,692 | 3/1994 | Barron . | |
| 5,306,501 | 4/1994 | Viegas . | |

FOREIGN PATENT DOCUMENTS

| | | |
|---|---|---|
| 0355977 | 2/1990 | European Pat. Off. . |
| 532213 | 3/1993 | European Pat. Off. . |
| 549253 | 6/1993 | European Pat. Off. . |
| 9600567 | 1/1996 | WIPO . |

*Primary Examiner*—David Buttner
*Attorney, Agent, or Firm*—George P. Hoare, Jr.; Kramer Levin Naftalis & Frankel LLP

[57] ABSTRACT

Block copolyethers having general formula (I):

$$RX-(CH_2-CHR_1-O-)_x-(-CH_2CHR_2-O-)_y-(-CH_2-CHR_3-O-)_z-R_4$$

wherein:

R is selected from H, alkyl, alkylaryl;

X is selected from O, S and N;

$R_1$, $R_2$ and $R_3$ are selected from H, $CH_3$, and $C_2$–$C_{10}$ alkyl radicals;

$R_4$ is selected from H, alkyl, acyl;

x,y,z represent the number of ether units and are integers which have such values that the molecular weight of the compound having general formula (I) is between 600 and 4000, and in addition (x+z)/y is between 1.5 and 5.0; with the proviso that:

a) either $R_1$ and $R_3$ are selected from H and $CH_3$, in which case $R_2$ is selected from $C_2$ to $C_{10}$ alkyl radicals, b) or $R_1$ and $R_3$ are selected from $C_2$–$C_{10}$ alkyl radicals, in which case $R_2$ is selected from H and $CH_3$.

14 Claims, No Drawings

BLOCK COPOLYMERS, THEIR PREPARATION AND THEIR USE AS LUBRICANTS

This is a continuation of application Ser. No. 08/678,246, filed Jul. 11, 1996, now abandoned.

The present invention relates to new oil-soluble polyethers, their preparation, and their use in the field of lubricants, particular for motor oil.

More specifically, the polyethers of the present invention are characterized by a three-block structure of the type ABA wherein A and B are blocks of alkyleneoxides.

Lubricating oils for motors consist of formulations of lubricant bases such as mineral oils, synthetic bases of the hydrocarbon and ester type, mixed with suitable additive systems.

The possibility of formulating lubricating oils with polyglycols is described in literature, particularly to improve some of the properties of the oils, mainly in terms of high viscosity indexes, good filming properties and anti-wear performance, high flash-points.

The difficulty in asserting the use of polyglycols as lubricating bases in motor oil formulations is mainly due to their marked hydrophilic nature (polyethyleneoxides) which can be shown by their limited miscibility both with mineral bases and with additives.

Oil-soluble polyglycols have recently been synthesized starting from α-epoxides substituted with alkyl groups (ethyl, butyl, hexyl etc.) capable of completely mixing with all components of motor oils.

For example U.S. Pat. No. 4,048,0123 describes the synthesis of a block polyglycol particularly suitable for transmission gears. This polyglycol consists of a block of polytetrahydrofuran obtained by cationic polymerization and a block of $C_8$–$C_{26}$ α-alkylepoxide obtained by anionic polymerization.

U.S. Pat. No. 4,793,939 relates to the formulation of a lubricating oil consisting of a paraffinic and naphthenic mineral base and a two-block oil-soluble polyglycol base consisting of a $C_2$–$C_4$ block and another $C_6$–$C_{40}$ block. The introduction of the polyalkyleneglycol improves the viscosity index, the resistance to wear and friction, the good properties of the mineral base remaining unaltered.

EP-A-355,977 describes the synthesis of a polyglycol to be used in formulations of two or four phase motor oils and in industrial lubricants The percentage of mineral base can vary from 0 to 40% and that of the polyglycol from 100 to 60%. It consists of a diblock structure consisting of from 35 to 80% of $C_2$–$C_4$ epoxides and from 1 to 35% of $C_6$–$C_{30}$ epoxide.

The triblock polyethers which are the object of the present invention, while maintaining the excellent viscosity indexes and good viscosities at 40 and 100° C. of the above polyglycols, additionally have excellent lubricating and anti-wear properties.

In accordance with this, the present invention relates to three-block copolyethers having general formula (I):

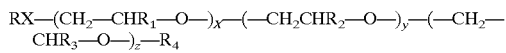

wherein:

R is selected from H, alkyl, alkylaryl;

X is selected from O, S and N;

$R_1$, $R_2$ and $R_3$, the same or different, are selected from H, $CH_3$, and $C_2$–$C_{10}$ alkyl radicals;

$R_4$ is selected from H, alkyl, acyl;

x,y,z, all different from zero, represent the number of ether units of each block, are integers which have such values that the molecular weight of the compound having general formula (I) is between 600 and 4000, preferably between 800 and 2000, and in addition (x+z)/y is between 1.5 and 5.0, preferably between 2.2 and 3.2, with the proviso that:

a) either $R_1$ and $R_3$ are selected from H and $CH_3$, in which case $R_2$ is selected from $C_2$ to $C_{10}$ alkyl radicals, b) or $R_1$ and $R_3$ are selected from $C_2$–$C_{10}$ alkyl radicals, in which case $R_2$ is selected from H and $CH_3$.

In one form of embodiment, the polyether having general formula (I) has R and $R_2$=n—$C_4H_9$, $R_3$=$CH_3$, $R_1$=$CH_3$, $R_4$=H, x=6, y=5, z=6.

In another form of embodiment, the polyether having general formula (I) has R and $R_2$=n—$C_4H_9$, $R_3$=$CH_3$, $R_1$=$CH_3$, $R_4$=H, x=6, y=4, z=6.

In another form of embodiment, the compound having general formula (I) has R=$R_2$=$R_4$=H, $R_1$=$R_3$=n—$C_4H_9$. x=5, y=4, z=5.

For the final properties of the product having general formula (I), the ratio (x+z)/y, which determines the solubility in oil of the copolymer having general formula (I), is determinant.

The compounds of the present invention are prepared by three anionic polymerization steps. The initiator molecule, which must contain at least one hydrogen atom suitable for being alkoxylated, can be an alcohol, a thiol, an amine. The basic catalysts used in the polymerization of each block comprise sodium hydroxide, potassium hydroxide, strontium carbonate, preferably potassium hydroxide.

When, for example, a compound having general formula (I) is to be prepared, x moles of epoxide ($CH_2$—$CHR_1$)=O, y moles of epoxide ($CH_2$—$CHR_2$)=O and finally z moles of epoxide ($CH_2$—$CHR_3$)=O are linked to the initiator molecule. Alternatively, it is possible to react a polyglycol having two terminal —OH with one or more alkylepoxides, still in the presence of basic catalysis. In this case the starting polyglycol acts as initiator and the final three-block polyether will contain, as internal block, the starting polyglycol.

At the end of the reaction with the epoxides, the reaction is inactivated by the addition of water, preferably in the form of sodium acetate trihydrate.

The polyether of the present invention has a molecular weight of between 600 and 4000 dalton, preferably between 800 and 2000 dalton.

This new group of polyethers is characterized by a high compatibility and miscibility with mineral oils, a low capacity of water absorption, high viscosity indexes, the possibility of modifying the viscosity at 40 and 100° C. by changing the ratio of the three polyalkyleneoxide blocks, excellent lubricating and anti-wear characteristics.

A further object of the present invention therefore relates to the use of the compound having general formula (I) as a lubricating oil for industrial gearing, differential gears and two-cycle engine oil.

The compound having general formula (I) can also be used as a component of formulations of partially or totally synthetic lubricating oils for 4-cycle engines. These latter formulations, which can also contain other additives normally used in lubricating oils (for example antioxidants, dispersers, detergents), comprise from 5 to 50% of the polyether having general formula (I), from 25 to 80% of synthetic lubricating bases and from 15 to 25% of additives.

The following experimental examples provide a better illustration of the present invention.

EXAMPLE 1

Preparation of the compound having general formula (I) wherein R and $R_2$=butyl, $R_1$=$R_3$=methyl, $R_4$=hyrogen, x=6, y=5, z=6

The reaction was carried out in a 1 liter pressure-resistant reactor equipped with a magnetic drag stirrer and with one inlet for the epoxides and another for the nitrogen for the flushings, a thermometer, a manometer and a safety valve. 54.9 g (0.49 moles) of potassium butylate, previously synthesized starting from butanol and potassium hydroxide, were introduced into the reactor. The reactor flushed with nitrogen was brought to about 90° C. and subsequently 165 g (2.84 moles) of propyleneoxide were added over a period of 60 minutes. At the end of the addition the reactor was left at 130° C. for 1 hour. 240 g (2.4 moles) of hexeneoxide were then introduced into the reactor heated to 150° C. over a period of 1 hour. The mixture was left to react for 1 hour and finally 165 g of propyleneoxide were added over a period of an hour. At the end of the third addition the reactor was left at 150° C. for a further hour.

The reactor was cooled to about 70° C. and the oligomer in the form of a potassium salt was subsequently discharged and treated with 38 g (0.28 moles) of sodium acetate trihydrate. The mixture was left under stirring for 12 hours at about 40° C. The oligomer in the form of an alcohol was then recovered by filtration on a porous septum The reaction yield was 98.1%.

The molecular weight of the oligomer is 1272 and the polydispersity 1.17 The percentage of the two components in the final oligomer is 54.7% of propyleneoxide and 39.4% of hexeneoxide.

The oligomer was then characterized both from a rheological and tribological point of view. The results are shown in table 1, which indicates, for comparative purposes, the characteristics of two commercial polyglycols, one, called NS9, consisting of about 85% by weight of polypropyleneoxide and the remaining 15% of polyethyleneoxide, the other, called SYN OA 60, consisting of a polybutyleneoxide.

TABLE 1

| Characteristics | Ex.1 | NS9 | SYN OA 60 |
|---|---|---|---|
| Visc. 100° C., cSt | 7.66 | 11.21 | 9.3 |
| Visc. 40° C., cSt | 43.08 | 57.19 | 57.6 |
| Viscosity index | 147 | 193 | 143 |
| 4 Wear Spheres; Wear diameter, mm | 0.35 | 0.59 | 0.71 |
| Almen- Wieland; Ult. tensile strength, kg | 2050 | 600 | 600 |
| SRV; Friction Coefficient | 0.1025 | 0.1074 | 0.1095 |

From the data of table 1, it can be seen that the product of example 1 of the present invention has better tribological characteristics than those of commercial polyethers. This proves the applicability of the product of example 1 as lubricant for industrial gearing, differential gears, 2-phase motor oil.

With respect to the measurements of table 1, the kinematic viscosity at 40° C. was carried out according to ASTM D445; the kinematic viscosity at 100° C. according to ASTM D445; the viscosity index according to ASTM D2270; the 4 wear sphere test according to ASTM D4172; the SRV according to DIN 51834.

In addition the copolymer of example 1 has complete mixability with mineral oils in all proportions.

The triblock copolymer of example 1 was also tested in a "full synthetic" formulation. A formulation (SYN/P) was prepared, consisting of 65% by weight of PAO (polyalphaolefins), 15% by weight of the above product of example 1 and 20% of additives. For comparative purposes, a formulation (SYN/E) was prepared, consisting of 65% by weight of PAO, 15% of esters of fatty acids with neopentyl alcohol and 20% of additives.

The 4 Wear sphere measurement of the SYNIP mixture (wear diameter in mm) gave a value of 0.49 against a value of 0.51 for the comparative mixture SYN/E.

The SRV measurement (friction coefficient) of the mixture SYN/P gave a value of 0.141 against the value of 0.122 for the mixture SYN/E.

The data relating to the "full synthetic" formulation show that the composition of the present invention has tribological performances comparable to those of a commercial oil with SH performances and can therefore be used as a lubricating oil for 4-phase motors.

EXAMPLE 2

Preparation of the compound having general formula (I) where R and $R_2$=butyl, $R_1$=$R_3$=methyl, $R_4$=hydrogen, x=6, y=4, z=6.

The reaction was carried out in a 50 ml pressure-resistant reactor, equipped with a magnetic drag stirrer and with one inlet for the epoxides and one for the nitrogen for the flushings, a thermometer, a manometer and a safety valve. Using the same procedure described in example 1, 2.8 g (25 mmoles) of potassium butylate were reacted with 8.7 g (150 mmoles) of propyleneoxide, then with 10 g (100 mmoles) of hexeneoxide and finally with 8.7 g (150 mmoles) of propyleneoxide. The oligomer in the form of a potassium salt was treated with 12 g (8.8 mmoles) of sodium acetate trihydrate and finally recovered by filtration in alcoholic form The reaction yield was 96%.

The molecular weight of the oligomer is 1172 and the polydispersity 1.17.

The allocation of the different protons (via $^1$HNMR and $^{13}$CNMR) of the three-block polyethers of examples 1 and 2, is given below.

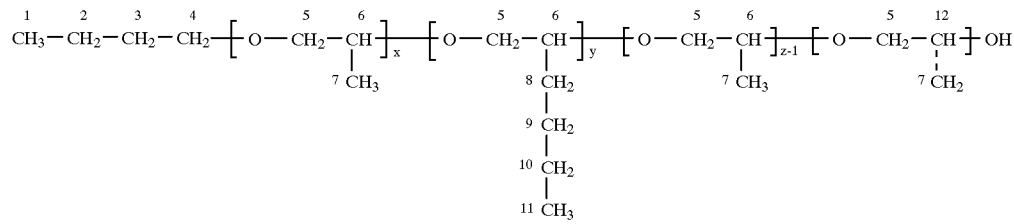

$^1$H-NMR (CD$_2$Cl$_2$): δ=0.9(m, C$^1$+C$^{11}$), 1.1–1.2(m,C$^7$), 1.3–1.6 (m,C$^2$+C$^3$+C$^8$+C$^9$+C$^{10}$), 3.2–3.5 (m,C$^5$+C$^6$) 3.7–3.9 (m,C$^{12}$)ppm $^{13}$C-NMR (CD$_2$Cl$_2$) δ=14 (C$^1$+C$^{11}$), 17.1–18.7 (C$^7$), 19.7(C$^2$), 23.2 (C$^{10}$) 28 (C$^9$) 31.9(C$^8$),32.2(C$^3$), 65.7–66.3(C$^{12}$), 71.4(C$^4$), 72–73.5 (C$^5$),74–80(C$^6$)ppm.

The oligomer was then characterized both from a rheological and from a tribological point of view with the following results:

Kinematic viscosity at 40° C. (ASTM D445)=36.75 cSt
Kinematic viscosity at 100° C. (ASTM D445)=6.29 cSt
Viscosity index (ASTM D2270)=121
Complete miscibility with mineral oils in all proportions.

EXAMPLE 3

Preparation of the compound having general formula (II) wherein R=R$_2$=R$_4$=H, R$_1$=R$_3$=butyl, x=5, y=4, z=5.

The reaction was carried out in a 50 ml pressure-resistant reactor, equipped with a magnetic drag stirrer and with one inlet for the epoxides and one for the nitrogen for the flushings, a thermometer, a manometer and a safety valve. Using the same procedure described in example 1, 1.8 g (6.7 mmoles) of potassium salt of tetraethyleneglycol were reacted with 17.5 g (174.7 mmoles) of hexeneoxide. The oligomer in the form of potassium salt was treated with 1.2 g (8.8 mmoles) of sodium acetate trihydrate and finally recovered by filtration in alcoholic form. The reaction yield was 97.5%

The molecular weight of the oligomer is 1177 and the polydispersity 1.09.

The allocation of the different protons (via $^1$HNMR and $^{13}$CNMR) of the three-block polyethers of examples 1 and 3, is given below.

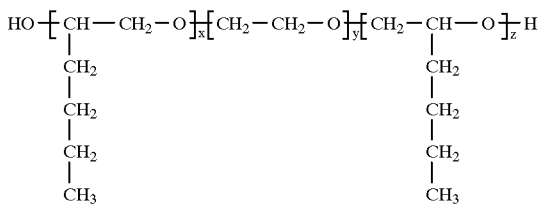

$^1$H-NMR (CD$_2$Cl$_2$): δ=0.8(t,C$^1$),1.1–1.4(m,C$^2$+C$^3$+C$^4$), 3.2–3.4 (m, C$^6$+C$^7$), 3.5–3.6 (m, C$^5$) ppm $^{13}$C-NMR (CD$_2$Cl$_2$): δ=13.8(C$^1$) 22.6(C$^2$),27.5 (C$^3$),31(C$^4$), 70–75 (C$^6$+C$^7$) 78–80(C$^5$)ppm The oligomer was then characterized both from a Theological and from a tribological point of view with the following results:

Kinematic viscosity at 40° C. (ASTM D445)=70.79 cSt
Kinematic viscosity at 100° C. (ASTM D445)=9.56 cSt
Viscosity index (ASTM D2270)=114
Complete miscibility with mineral oils in all proportions.

We claim:

1. A method of lubricating industrial gearing, differential gears, and 2-cycle engines, which comprises the step of lubricating the gears with a lubricating composition which comprises a lubricant and a three-block copolyether having the general formula (I)

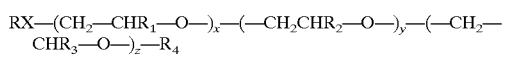

wherein

R is selected from the group consisting of hydrogen, an alkyl, and an alkylaryl;

X is selected from the group consisting of oxygen, sulfur and nitrogen;

R$_1$, R$_2$ and R$_3$ which may be the same or different, are selected from the group consisting of hydrogen, a CH$_3$ radical, and a C$_2$–C$_{10}$ alkyl radical;

R$_4$ is selected from the group consisting of hydrogen, an alkyl, and an acyl;

x, y, z, which are all different from zero and which represent the number of ether units of each block, are integers which have such values such that the molecular weight of the polyether having the general formula (I) is between 600 and 4000 and in addition (x+z)/y is between 1.5 and 5.0; with the proviso that a) either R$_1$ and R$_3$ are selected from the hydrogen and the CH$_3$ radical, in which case R$_2$ is selected from the C$_2$ to C$_{10}$ alkyl radicals or b) R$_1$ and R$_3$ are selected from the C$_2$–C$_{10}$ alkyl radicals, in which case R$_2$ is selected from the hydrogen and the CH$_3$ radical.

2. The method of claim 1, wherein the amount of the three-block copolyether is between 5 and 50%.

3. The method of claim 1, wherein the lubricating composition comprises 25–80% of the lubricant, 5 to 50% of the three-block copolyether, and 15–25% of an additive selected from the group consisting of antioxidants, dispersers, and detergents and wherein the lubricant is a synthetic lubricating base.

4. The method of claim 1, wherein the ratio (x+z)/y is between 2.2 and 3.2.

5. The method of claim 1, wherein the molecular weight of between 800 and 2000 dalton.

6. The method of claim 1, wherein R and R$_2$ are butyl, R$_1$ and R$_3$ are methyl, R$_4$ is hydrogen, x is 6, y is 5, and z is 6.

7. The method of claim 1, wherein R, R$_2$, and R$_4$ are hydrogen, R$_1$ and R$_3$ are n-butyl, x is 5, y is 4, and z is 5.

8. A method of lubricating 4-phase motors with a lubricating composition which comprises a lubricating oil and a three-block copolyether having the general formula (I)

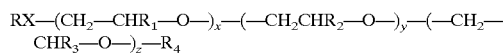

wherein

R is selected from the group consisting of hydrogen, an alkyl, and an alkylaryl;

X is selected from the group consisting of oxygen, sulfur and nitrogen;

R$_1$, R$_2$ and R$_3$, which may be the same or different, are selected from the group consisting of hydrogen, a CH$_3$ radical, and a C$_2$–C$_{10}$ alkyl radical;

R$_4$ is selected from the group consisting of hydrogen, an alkyl, and an acyl;

x, y, z, which are all different from zero and which represent the number of ether units of each block, are integers which have such values such that the molecular weight of the polyether having the general formula (I) is between 600 and 4000 and in addition (x +z)/y is between 1.5 and 5.0; with the proviso that a) either R$_1$ and R$_3$ are selected from the hydrogen and the CH$_3$ radical, in which case $R_2$ is selected from the $C_2$ to $C_{10}$ acyl radicals, or b) $R_1$ and $R_3$ are selected from the $C_2$–$C_{10}$ alkyl radicals in which case $R_2$ is selected from the hydrogen and the $CH_3$ radical.

9. The method of claim 8, wherein the amount of the three-block copolyether is between 5 and 50%.

10. The method of claim 8, wherein the lubricating composition comprises 25–80% of the lubricant, 5 to 50% of the three-block copolyether, and 15–25% of an additive selected from the group consisting of antioxidants, dispersers, and detergents and wherein the lubricant is a synthetic lubricating base.

11. The method of claim 8, wherein the ratio $(x+z)/y$ is between 2.2 and 3.2.

12. The method of claim 8, wherein the molecular weight is between 800 and 2000 dalton.

13. The method of claim 8, wherein R and $R_2$ are n-butyl, $R_1$ and $R_3$ are methyl, $R_4$ is hydrogen, x is 6, y is 5, and z is 6.

14. The method of claim 8, wherein R, $R_2$, and $R_4$ are hydrogen, $R_1$ and $R_3$ are butyl, x is 5, y is 4, and z is 5.

* * * * *